US009613058B2

United States Patent
Shen et al.

(10) Patent No.: US 9,613,058 B2
(45) Date of Patent: Apr. 4, 2017

(54) NEURAL NETWORK IMAGE CURATION CONTROL

(71) Applicant: Adobe Systems Incorporated, San Jose, CA (US)

(72) Inventors: Xiaohui Shen, San Jose, CA (US); Xin Lu, State College, PA (US); Zhe Lin, Fremont, CA (US); Radomir Mech, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 146 days.

(21) Appl. No.: 14/573,963

(22) Filed: Dec. 17, 2014

(65) Prior Publication Data

US 2016/0179844 A1 Jun. 23, 2016

(51) Int. Cl.
*G06F 17/30* (2006.01)
*G06K 9/62* (2006.01)
*G06K 9/00* (2006.01)

(52) U.S. Cl.
CPC ... *G06F 17/30247* (2013.01); *G06K 9/00261* (2013.01); *G06K 9/6215* (2013.01); *G06K 9/6227* (2013.01)

(58) Field of Classification Search
None
See application file for complete search history.

(56) References Cited

U.S. PATENT DOCUMENTS

| 2014/0133764 A1* | 5/2014 | Hong | G06F 17/30244 |
| | | | 382/224 |
| 2014/0270488 A1* | 9/2014 | Suleyman | G06K 9/00362 |
| | | | 382/157 |

OTHER PUBLICATIONS

Lu,"Rapid: Rating Pictorial Aesthetics using Deep Learning", ACM Multimedia, 2014., 2014, 10 pages.
Uchihashi,"Video Manga: generating semantically meaningful video summaries", In Proc of ACM Multimedia (Part 1), ACM New York, NY, USA, 1999., 1999, 10 pages.

* cited by examiner

*Primary Examiner* — Vu Le
*Assistant Examiner* — Delomia L Gilliard
(74) *Attorney, Agent, or Firm* — Wolfe-SBMC

(57) ABSTRACT

Neural network image curation techniques are described. In one or more implementations, curation is controlled of images that represent a repository of images. A plurality of images of the repository are curated by one or more computing devices to select representative images of the repository. The curation includes calculating a score based on image and face aesthetics, jointly, for each of the plurality of images through processing by a neural network, ranking the plurality of images based on respective said scores, and selecting one or more of the plurality of images as one of the representative images of the repository based on the ranking and a determination that the one or more said images are not visually similar to images that have already been selected as one of the representative images of the repository.

20 Claims, 7 Drawing Sheets

500

---
Greedy Selection of Representative Photos

Input: $N$ photos $\{p_1, p_2, \ldots, p_i, \ldots, p_N\}$, in which each photo is associated with image quality score $iq_i$, face quality score $fq_i$, aesthetic quality score $aq_i$, and visual descriptor $v_i$ 1: Initialize the selected photo set: $\mathcal{R} = \emptyset$
2: for $i \in [1, N]$ do
3:    Compute $s_i = \alpha \times aq_i + (1 - \alpha) \times fq_i$
4: end for
5: Sort $\{p_i\}$ by $\{s_i\}$ in descending order
6: $\mathcal{R} = \mathcal{R} \cup \{p_1\}$
7: for $i \in \{p_i\}$ do
8:    if $iq_i > \gamma$
9:      for $p_j \in \mathcal{R}, i \neq j$ do
10:        if $\text{dist}(v_i, v_j) < \beta$
11:          flag = false; break;
13:        end if
14:      end for
15:      if flag == true
16:        $\mathcal{R} = \mathcal{R} \cup \{p_i\}$
17:        if $\#\mathcal{R} > K$
18:          return selected $K$ photos $\mathcal{R}$
19:        end if
20:      end if
21:    end if
22: end for

NEURAL NETWORK IMAGE CURATION CONTROL

BACKGROUND

Image curation involves selection of images that are to represent images in a repository, e.g., in a folder, an image search result, and so on. When performed manually, image curation becomes extremely time consuming, especially when confronted with a large number of redundant images and thus a user typically selected a disproportionate number of the redundant images.

Even when performed automatically using conventional techniques, redundant images are typically selected, such as due to reliance on cues such as time, location, and visual similarity. For example, conventional techniques can give greater weight to recent images and thus fail to capture images taken at a point further back in time. Accordingly, the images selected using conventional techniques, regardless of whether performed manually or automatically, typically did not achieve a result that represented the images in the repository as a whole, but rather overrepresented a subset of those images.

SUMMARY

Neural network image curation techniques are described. In one or more implementations, curation is controlled of images that represent a repository of images. A plurality of images of the repository are curated by one or more computing devices to select representative images of the repository. The curation includes calculating a score based on image and face aesthetics, jointly, for each of the plurality of images through processing by a neural network, ranking the plurality of images based on respective scores, and selecting one or more of the plurality of images as one of the representative images of the repository based on the ranking and a determination that the one or more said images are not visually similar to images that have already been selected as one of the representative images of the repository.

In one or more implementations, in a digital medium environment for curating images, where the images are included in a repository having a plurality of images, a method for representing the plurality of the image in the repository in the digital medium environment is described. The method includes receiving a request to curate the plurality of images to select images that are representative of the plurality of images in the repository and for each image, generating a plurality of patches from the image and detecting activations of a plurality of image characteristics for each of the plurality of patches using a neural network. The plurality of image characteristics pertain to image and face aesthetics. One or more of the plurality of images are selected as one of the representative images of the repository based on the detected activations and a determination that the one or more images are not visually similar to images that have already been selected as one of the representative images of the repository.

In one or more implementations, a system is described to control curation of images to represent a repository of images. The system includes an image curation module implemented at least partially in hardware to curate a plurality of images of the repository to select representative images of the repository. The image curation module includes a joint image and face aesthetic calculation module to calculate a score based on image and face aesthetics, jointly, for each of the plurality of images through processing by a neural network, an image ranking module to rank the plurality of images based on respective said scores, and an image selection module to select one or more of the plurality of images as one of the representative images of the repository based on the ranking and a determination that the one or more images are not visually similar to images that have already been selected as one of the representative images of the repository.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 5 depict an example of an algorithm that is usable by an image curation module of FIG. 3 to perform image curation involving greedy selection in a digital environment.

DETAILED DESCRIPTION

Overview

Figure 1:
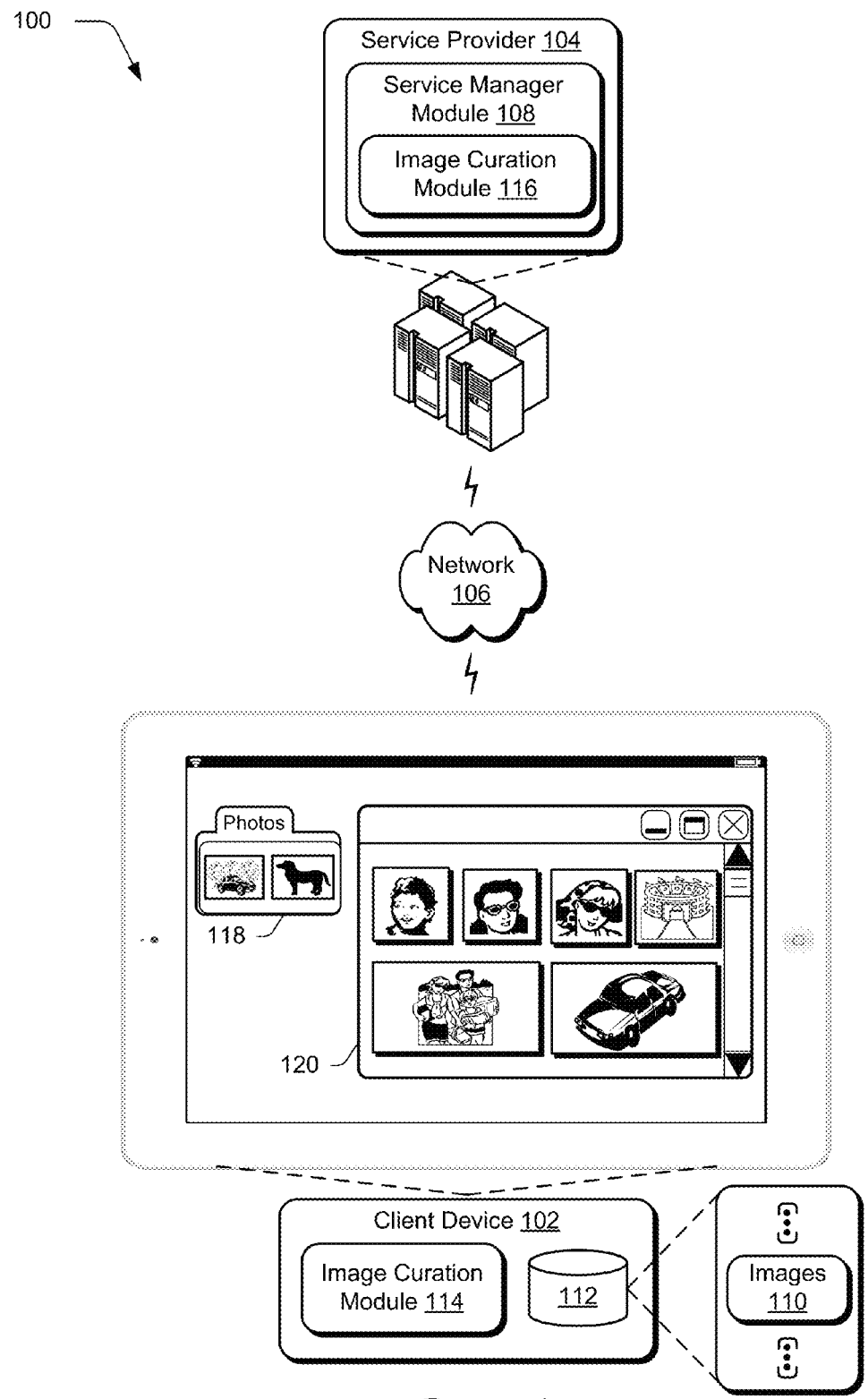
FIG. 1 is an illustration of an environment in an example implementation that is operable to employ techniques described herein.

Image curation addresses the challenge of selecting good and representative images from a repository (e.g., collection) of images that are usable to represent the images in the repository as a whole. As a highly subjective process, image curation is affected by a variety of factors. For example, whether performed manually or automatically, convention techniques typically curate images based on cues such as time, location, and visual similarity. Thus, these techniques could cause overrepresentation of a particular subset of the images and even result in selection of poor quality images.

Neural network image curation control techniques are described. In one or more implementations, the techniques control curation of images in a manner that addresses quality of the images. For example, it has been found that conventional techniques have ignored face aesthetics, image quality, and image aesthetics. Face aesthetics refer to face quality (e.g., blur, compression, and lighting), facial expression, and pose, which plays an important role for scene curation involving images of people. Image quality indicates the low-level quality of an image, such as blur, noise, low-contrast, and lighting. Image aesthetics indicates the visual appeal of an image, such as due to composition of the image. Image aesthetics play an important role for scenery photo curation.

Face aesthetics, image quality, and image aesthetics are high-level concepts. Whether an image is of good quality or bad quality, aesthetically appealing or not, are determined by various image characteristics. For instance, images treated as good quality may be due to good facial expression, smiling face, shallow depth-of-field faces, high-contrast image, and so on whereas bad-quality image/face may be caused by low-contrast, out-of-focus blur/motion blur, noise, under exposure, or over exposure. Such variations make it difficult to design handcrafted features using conventional techniques that fit those situations in a general manner.

Accordingly, the techniques described herein employ a neural network that is configured to learn face aesthetics, image quality, and image aesthetics. To avoid redundancy in the curated image, visual semantics are also taken into consideration. In one such example, an image curation pipeline is described that jointly examines image quality, face quality, image aesthetics, and visual semantics. A greedy approach is then employed to select representative photos from the repository of images, such as for use in an image search result, to represent images stored at a particular location, and so forth. Further discussion of these and other examples is described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a client device 102 and a service provider 104 that are communicatively coupled, one to another, via a network 106.

Computing devices that implement the client device 102 and the service provider 104 are configurable in a variety of ways. Computing devices, for instance, may be configured as a desktop computer, a laptop computer, a mobile device (e.g., assuming a handheld configuration such as a tablet or mobile phone as illustrated for client device 102), and so forth. Thus, the computing devices range from full resource devices with substantial memory and processor resources (e.g., personal computers, game consoles) to a low-resource device with limited memory and/or processing resources (e.g., mobile devices). Additionally, although a single computing device is shown for the client device 102, the computing devices may be representative of a plurality of different devices, such as multiple servers utilized by a business to perform operations "over the cloud" as further described in relation to FIG. 7.

The service provider 104 includes a service manager module 108 that is representative of functionality to maintain, manage, and control services that are accessible to the client device 102 via the network 106. Examples of these services include search engines, network data storage, image sharing services, social network services, and so on. The client device 102, for instance, may access the service provider 104 via the network to obtain images 110, which are illustrated as stored 112 locally at the client device 102. Images 110 are also obtainable by the client device 102 in a variety of other ways, such as through use of an image capture device of the client device 102.

The client device 102 and the service provider 104 are also illustrated as including respective image curation modules 114, 116. The image curation modules 114, 116 are representative of functionality usable within a digital environment to select, preserve, maintain, and archive images 110. For example, the image curation module 114 is configured to control curation of images 110 to select images that are representation of a repository (i.e., collection) of the images 110 as a whole, automatically and without user intervention. In this way, the images are usable to promote efficient user selection and navigation, such as to discover images of interest through accurate depiction of images that are representative of images in the repository.

As illustrated, a representation 118 is depicted in a user interface displayed by a display device of the client device 102. The representation 118 denotes a storage location in a file hierarchy of the client device 102 (e.g., folder) in this example that includes the plurality of images 110. The representation 118 also includes images selected from the plurality of images 110 stored in the folder that are used to represent the images contained therein, which are selected through use of the image curation module 114. In another example, image search results 120 are displayed, with selection made by the image curation module 114 to represent the images as ranked by the image curation module 114. Thus, the image curation module 114 is supportive of a variety of different functionality, an example of operation of which is described in the following and shown in corresponding figures.

Figure 2:
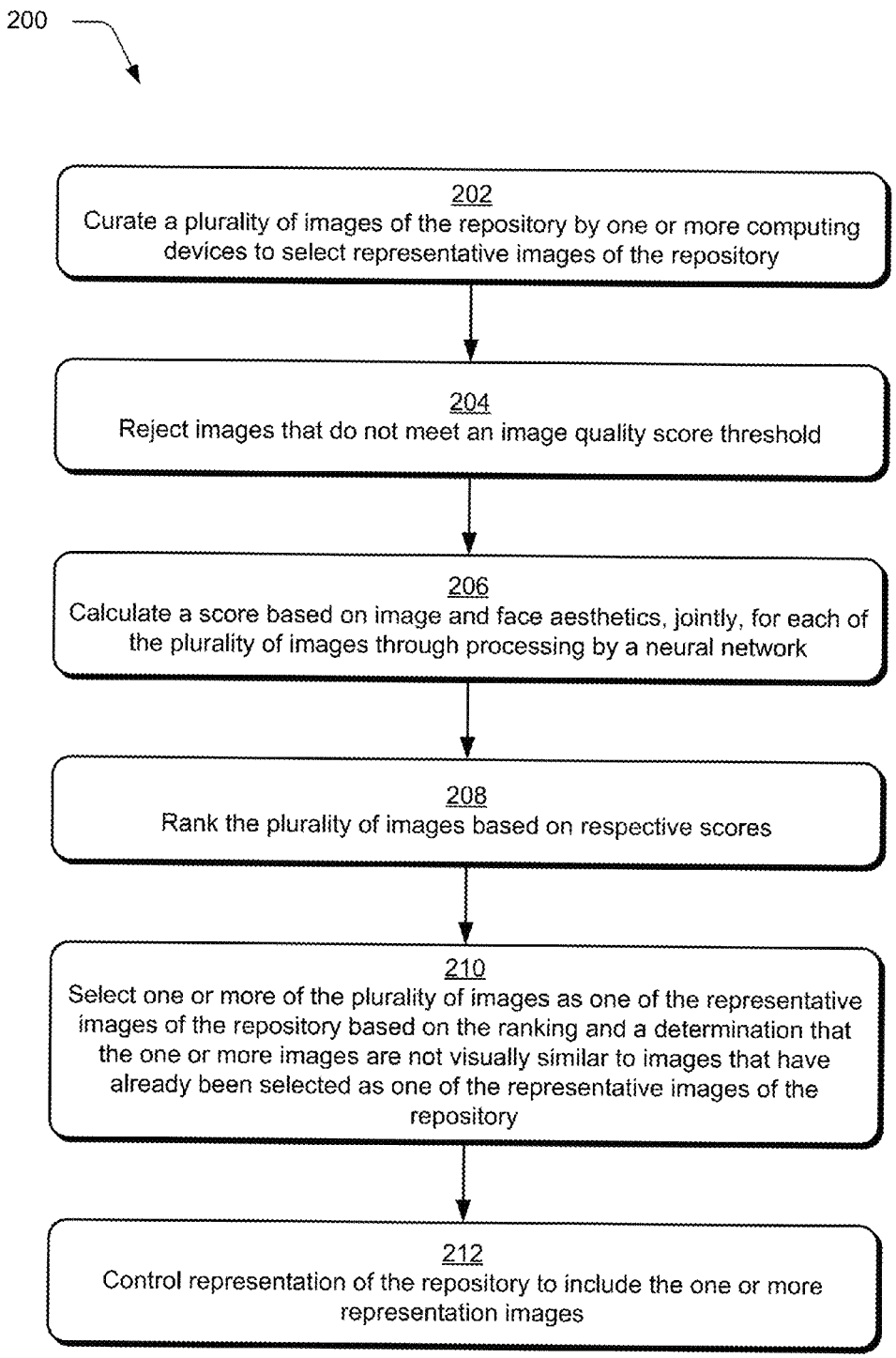
FIG. 2 is a flow diagram depicting a procedure in an example implementation in which image curation techniques are described that address image and face aesthetics.
Figure 3:
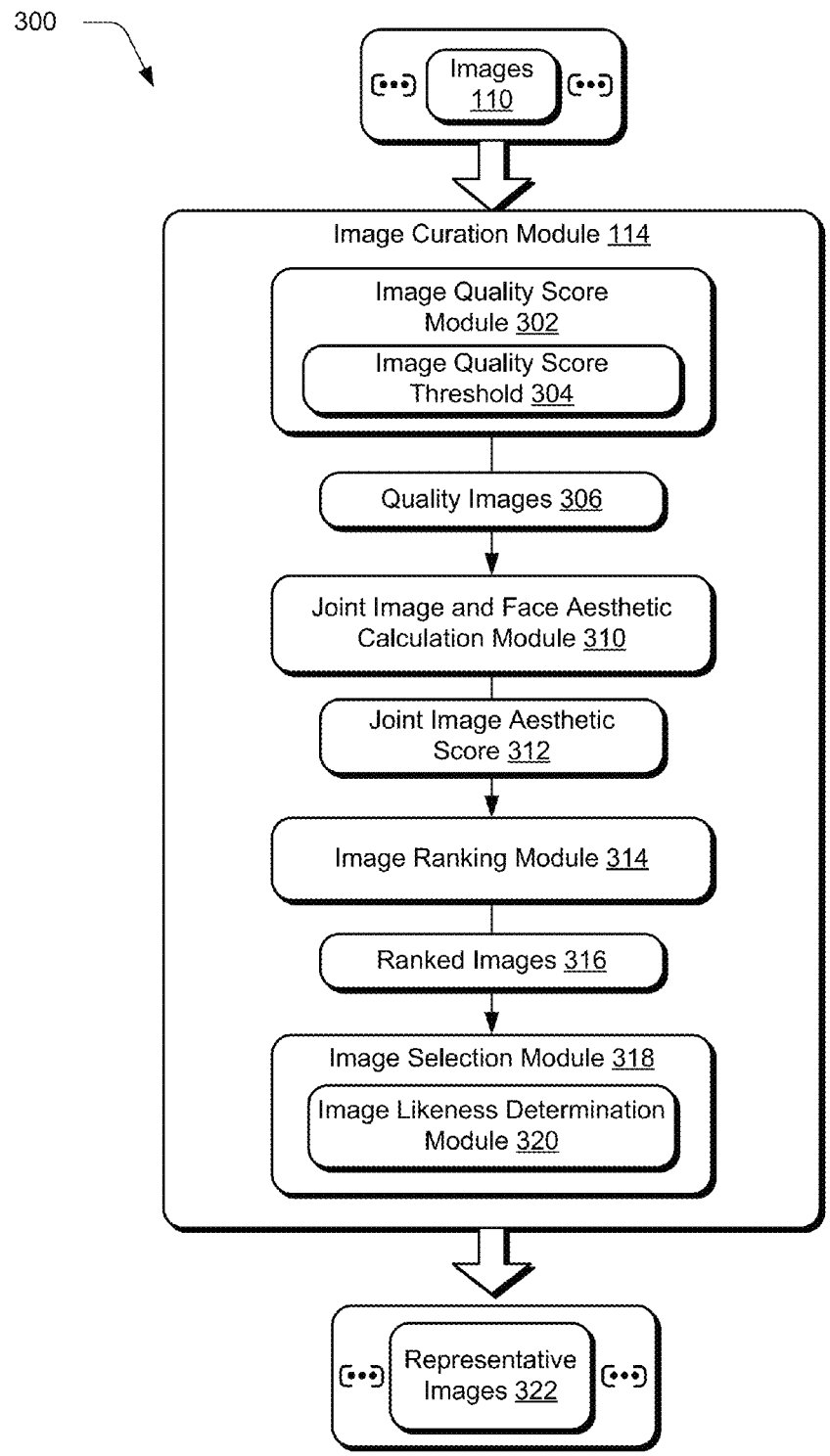
FIG. 3 depicts a system in an example implementation showing an image curation module of FIG. 1 in greater detail.

FIG. 2 depicts a procedure 200 in an example implementation in which image curation techniques are described that address image and face aesthetics. FIG. 3 depicts a system 300 in an example implementation showing the image curation module 114 of FIG. 1 in greater detail. In the following, reference is made interchangeably to the procedure 200 of FIG. 2 and the system 300 of FIG. 3. Aspects of the procedures may be implemented in hardware, firmware, or software, or a combination thereof. The procedure is shown as a set of blocks that specify operations performed by one or more devices and are not necessarily limited to the orders shown for performing the operations by the respective blocks.

The image curation module 114 of FIG. 3 receives images 110 for processing, which are included as part of a repository, i.e., collection. As previously described, the images 110 may originate from a variety of sources, such as included within a folder, as part of an online service, received as an image search result, and so on. The plurality of images of the repository are then curated by one or more computing devices to select representative images of the repository (block 202), an example of which is described as follows.

The images 110 are received by an image quality score module 302 that is representative of functionality to reject image that do not meet an image quality score threshold 304 (block 204). For example, the image quality score module 302 processes the images 110 to calculate a score that is indicative of a quality of the image 302, such as an amount of blue, noise, motion, under exposure, whether the image 110 has low contrast, lighting of the image 110, and so on. The image quality score threshold 304 defines a minimum amount of quality that is usable to represent the repository and thus images 110 that do not meet this threshold are rejected and thus quality images 306 are output for further processing. Similar techniques are usable for rejecting images that do not meet a face quality threshold, face aesthetic threshold, or image aesthetic threshold. In this way, images that are used to represent the repository have an increased likelihood of being visually pleasing to a user and thus improve a user's experience.

A joint image and face aesthetic calculation module 310 is then used to process the quality images 306 to calculate a score based on image and face aesthetics, jointly, for each of the plurality of images through processing by a neural network (block 206). Aesthetics, such as face and image aesthetics, are used in the following in selection of good and representation images from a repository of images. For example, both good face aesthetics (e.g., good expressions, can view the person in the image) and bad faces (e.g., blurry, closed eyes, and so forth) vary largely among images. Accordingly, the joint image and face aesthetic calculation module 310 employs a neural network training approach to distinguish good faces from bad faces using training data. In this way, the same feature extraction algorithm and trained classifier is usable to estimate aesthetics for any image.

For example, a neural network of the joint image and face aesthetic calculation module 310 is trainable using images having labeled faces, e.g., "good" or "bad." Bad faces, for instance, may be characterized by motion blur, out of focus, bad illumination, severe occlusion, undesired closed eyes, low contrast, bad quality or have image compression, undesirable expressions, and so on. A deep convolutional neural network is then trained using the images having convolutional layers and fully connected layers.

Figure 4:
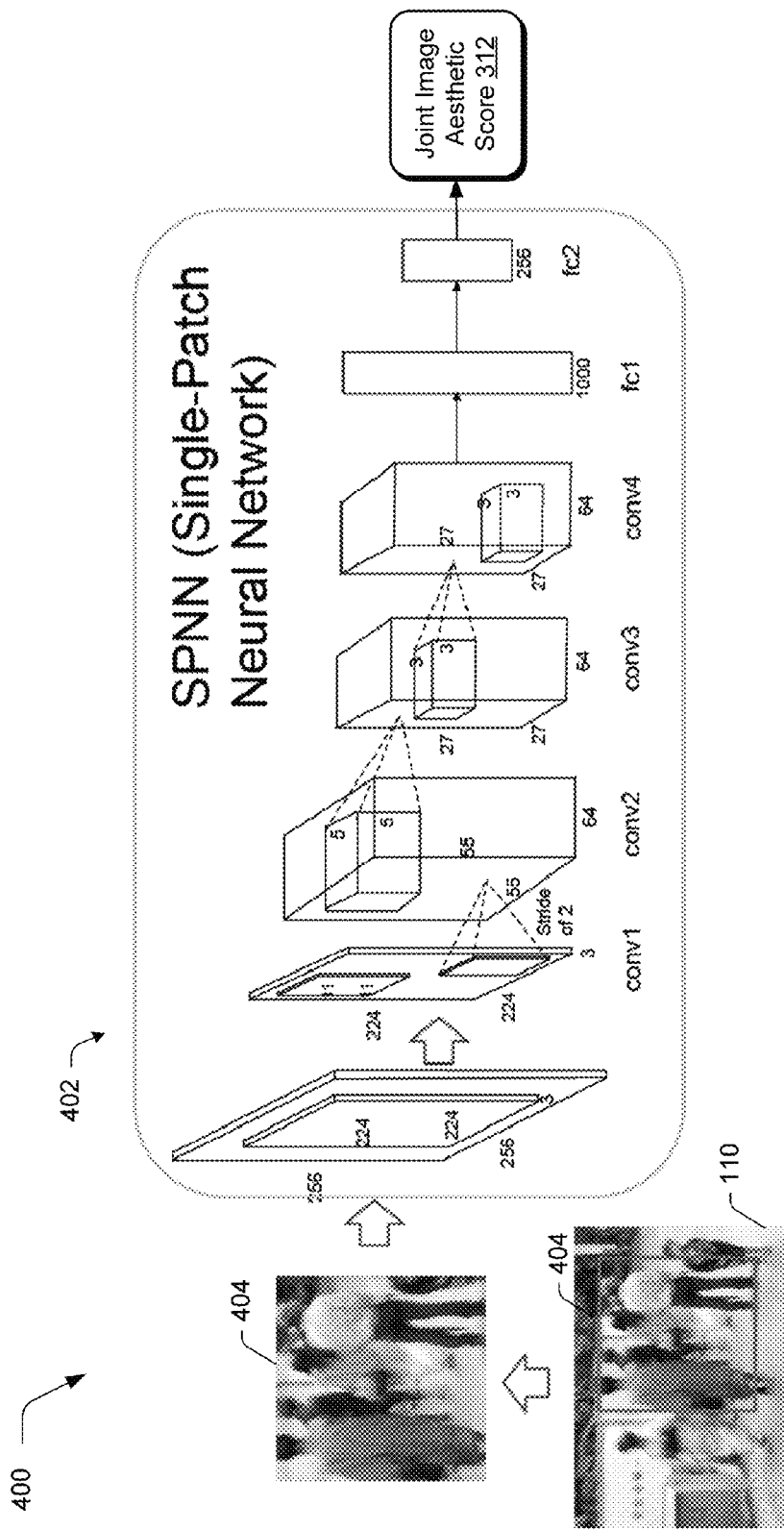
FIG. 4 depicts an example of a deep convolutional neural network as processing patches taken from an image to arrive at a joint image aesthetic score.

An example 400 of a neural network 402 is shown in FIG. 4. As illustrated, the neural network 402 in this example includes a plurality of neural layers, including four convolution layers (e.g., labeled as "conv1," "conv2," "conv3," and "conv4") and two fully connected layers, labeled as "fc1" and "fc2". The neural layers are configured to learn activations (e.g., amounts) of image characteristics, such as an amount of darkness, light, contrast, and so forth that together are usable to define higher-level image aesthetics and face aesthetics through use of a joint image aesthetic score 312. For example, in order to learn whether the image 110 is aesthetically "good" activations of image characteristics such as lighting, noise, whether the image is "upright", and so on may be learned by the neural network module 110 to define an image aesthetic score. Similar techniques are usable to define a face aesthetic score and thus the joint image aesthetic score 312 is usable to describe both aesthetics.

In order to efficiently process the images 110, patch based neural network techniques may be employed. For example, the patches 404 may be randomly sampled from the image having a fixed size, e.g., 128, 196, 256, 320 pixel sizes and so forth, and may be taken from multiple scales. Additionally, these patches 404 may be sampled without downsampling the image 106 and thus may be performed without loss of information.

The patches 404 are then used to train the neural network 402. The neural network 402, for instance, is configurable to calculate activations of image characteristics for each of the patches 404. As previously described, the image characteristics describe a variety of different attributes of the image 110, such as noise, darkness, contrast, structure, whether an alignment is upright, likelihood of including a part of an object (e.g., face), and so forth.

These activations may be expressed in a variety of ways. For example, for each of the patches 404, a vector having a plurality of dimensions is generated in which each of the dimensions has a corresponding image characteristic. Thus, the vector expresses an amount of each of the respective image characteristics through use of the activations using the dimensions of the vector.

Thus, the neural network 402 includes seven neural layers in this example, some of which are convoluted and some are fully connected. Whenever the patch 404 is passed to the neural network 402, neurons at various levels analyze that patch 404 and pass it on the next level. At the end of the seventh layer in this example, a vector is generated having a plurality of dimensions, each of which corresponding to an image characteristic, which is a result of response from the neurons at the last level. The vector is then usable to calculate a joint image aesthetic score 312 for each of the images 110 based on the overall response of the neural network for patches 404 taken from the images, e.g., the activations for the various characteristics that together describe face and image aesthetics.

An image ranking module 314 then ranks the plurality of images based on respective scores (block 208) and thus jointly considers aesthetics involving the image and face, if applicable. An image selection module 318 then processes the ranked images 316 in order of ranking to select which images are to be considered as representative of the repository of images as a whole, i.e., the representative images 322.

This includes use of an image likeness determination module 320 to select one or more of the plurality of images based on lack of similarity to already selected images. The image likeness determination module 320, for instance, is configured to determine whether an image selected in ranked order from the ranked images 316 is visually similar to images that have already been selected as one of the representative images of the repository. If so, the image is rejected and if not, the image is included as one of the representative images 322 of the repository. In this way, the image curation module 114 supports a digital environment to select images that are representative of images in a repository and thus supports efficient user navigation and selection of those images.

FIG. 5 depicts an example of an algorithm 500 that is usable by the image curation module 116 of FIG. 3 to perform image curation involving greedy selection in a digital environment. The algorithm takes as in input N images (e.g., photos), denoted as $p_1, \ldots, p_N$, in which each image is associated with an image quality score $iq_i$, a face quality score $fq_i$, an aesthetic quality score $aq_i$, and a visual descriptor $v_i$.

At the first line, the selected photo set is initialized. At the second and third lines, an iterative process begins from image 1 to N to compute a joint image aesthetic score $s_i$ 312 which is a combination of the aesthetic quality score $aq_i$ and the image quality score $iq_i$. At the fifth line the photos are sorted based on the joint image aesthetic score $s_i$ 312 in descending order and the highest ranked photo is included in the collection of representative photos at line six of the algorithm 500.

For the remaining photos beginning at line 8, a determination is made as to whether an image quality score $iq_i$ is higher than an image quality score threshold γ 304, and if not, the image is rejected. If so, an image likeness determination is made to determine whether a distance between visual descriptions is less than a threshold β, and if so, the image is rejected. These iterations continue until a desired number K of representative photos have been collected. In this way, images (e.g., photos in this example) are selected.

Figure 6:
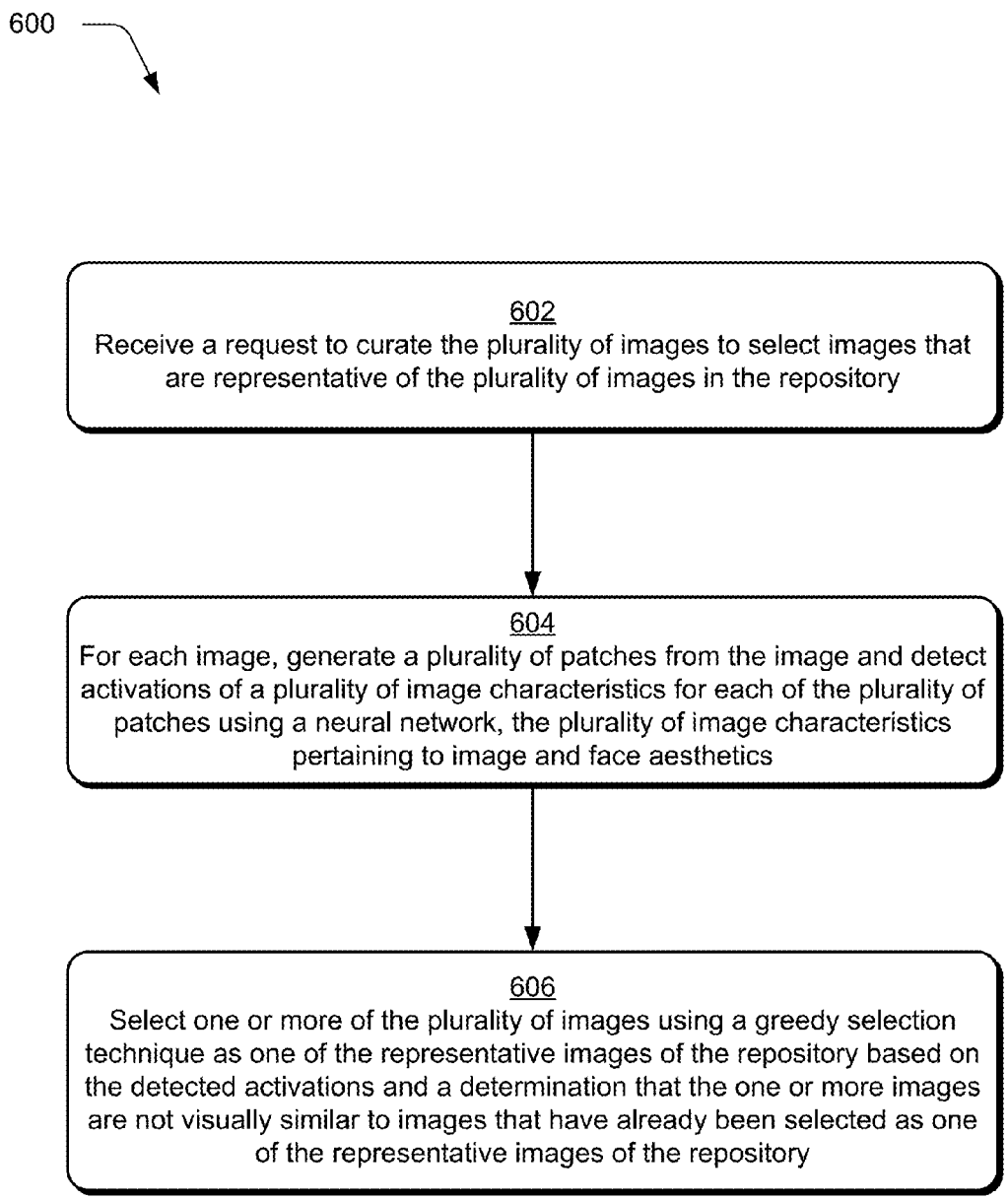
FIG. 6 is a flow diagram depicting a procedure in an example implementation in which a neural network is used to process patches to perform image curation.

FIG. 6 depicts an example procedure 600 in which a neural network is used to process patches to perform image curation. The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-5.

A request is received to curate a plurality of image to select images that are representative of the plurality of images in a repository (block 602). The request, for example, may involve processing of an image search result, images available via folder, an online photo sharing service, images exposed via a social network service, and so on.

A plurality of patches are generated from the image and activation of a plurality of image characteristics are detected for each of the plurality of patches using a neural network, the plurality of image characteristics pertaining to image and face aesthetics (block 604). As shown in FIG. 5, for instance, a deep convolutional neural network 402 includes a plurality of neural layers to process patches 404 taken from an image 110. The processing is used to identify activations (e.g., relative amounts) of image characteristics of the patches 404, which is expressible via a vector having a plurality of dimensions in which each of the dimensions corresponds to an image characteristic.

One or more of the plurality of images are selected using a greedy selection technique as one of the representative images of the repository based on the detected activations and a determination that the one or more images are not visually similar to images that have already been selected as one of the representative images of the repository (block 606). Greedy selection, for instance, is used to gradually add images starting from an empty set as described in relation to the algorithm of FIG. 4. In this way, a digital environment is supported that selects visually distinct images having good image and face aesthetics. A variety of other examples are also contemplated as described above.

Example System and Device

Figure 7:
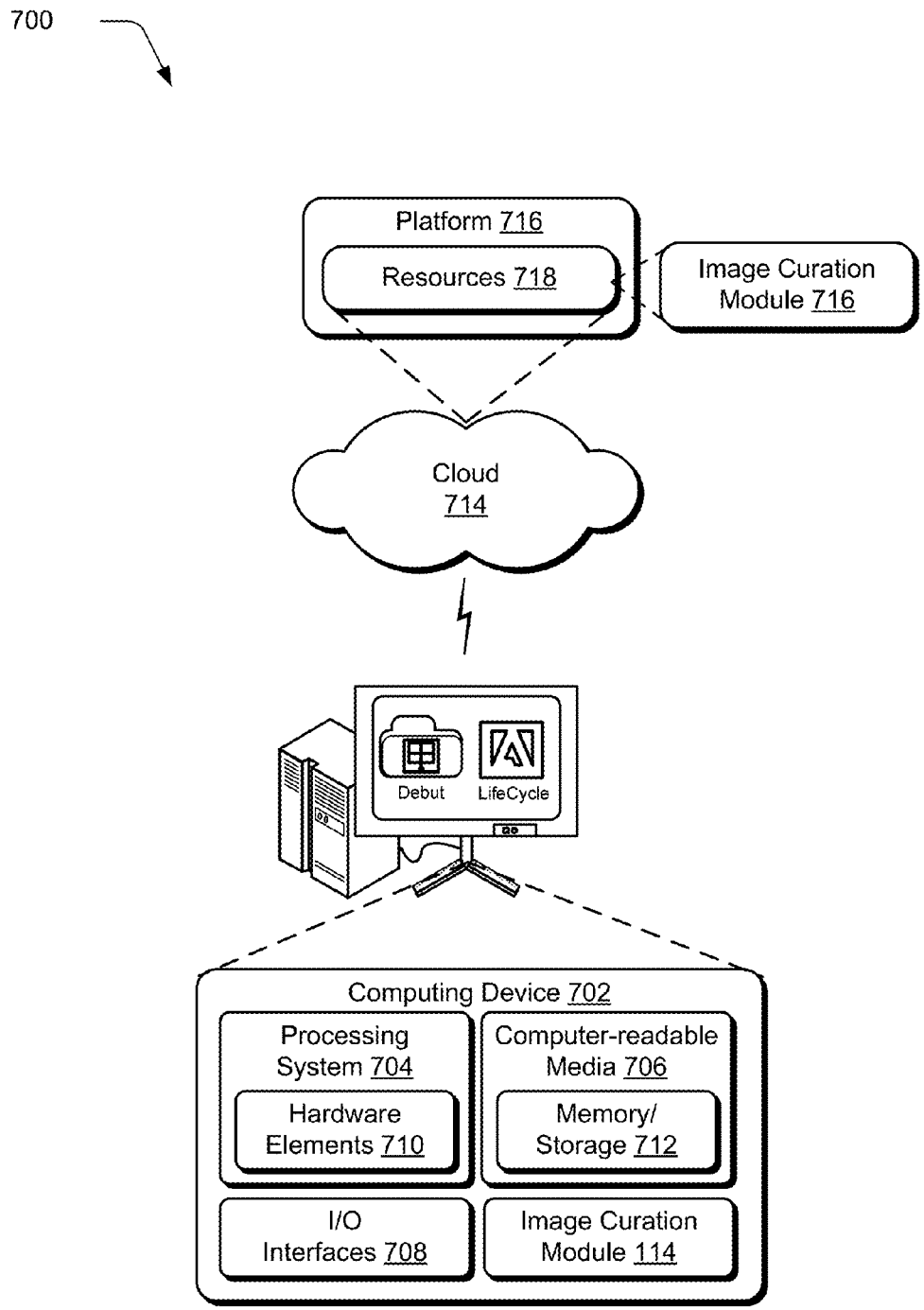
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the image curation modules 114, 116. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method to control curation of images by a computing device that represent a repository of images, the method comprising:
   curating, by the computing device, a plurality of images of the to select representative images of the repository, the curating including:
      calculating a score based on image and face aesthetics, jointly, for each of the plurality of images through processing by a neural network;
      ranking the plurality of images based on respective said scores; and
      selecting one or more of the plurality of images as one of the representative images of the repository based on the ranking and a determination that the one or more said images are not visually similar to images that have already been selected as one of the representative images of the repository.
2. A method as described in claim 1, wherein the calculating of the score based on image and face aesthetics, jointly, for each of the plurality of images includes:
   generating a plurality of patches from the each said image;
   detecting activations of a plurality of image characteristics for each of the plurality of patches using the neural network, the plurality of image characteristics pertaining to image and face aesthetics; and the calculating of the score is based on at least in part on the detected activations.

3. A method as described in claim 2, wherein the activations describe an amount of a corresponding image characteristic.

4. A method as described in claim 2, wherein the calculating of the score includes aggregating the detected activations for the plurality of patches.

5. A method as described in claim 2, wherein the detected activations for a respective said patch are included in a vector that has a plurality of dimensions, each of the dimensions corresponding to a respective said image characteristic.

6. A method as described in claim 1, further comprising:
receiving the plurality of images responsive to an image search; and
causing output of the representative images as an image search result of the image search.

7. A method as described in claim 1, further comprising controlling a representation of the repository in a user interface to include the representative images, the representation of the repository selectable via user interaction to cause output of the plurality of images in the user interface.

8. A method as described in claim 1, further comprising rejecting images that do not meet an image quality score threshold, face quality threshold, face aesthetic threshold, or image aesthetic threshold, and wherein the plurality of images processed as part of the curating meet the image quality score threshold face quality threshold, face aesthetic threshold, or image aesthetic threshold.

9. A method as described in claim 7, wherein the image quality score threshold is based at least in part on sharpness, resolution, exposure, light, blur, and noise of respective said images.

10. A method as described in claim 1, wherein the image and face aesthetics are based at least in part on image characteristics including color and composition of respective said images.

11. In a digital medium environment for curating images, where the images are included in a repository having a plurality of images, a method by at least one computing device for representing the plurality of the image in the repository in the digital medium environment, the method comprising:
receiving, by the at least one computing device, a request to curate the plurality of images to select images that are representative of the plurality of images in the repository;
for each said image, generating, by the at least one computing device, a plurality of patches from the image and detecting activations of a plurality of image characteristics for each of the plurality of patches using a neural network, the plurality of image characteristics pertaining to image and face aesthetics; and
selecting, by the at least one computing device, one or more of the plurality of images using a greedy selection technique as one of the representative images of the repository based on the detected activations and a determination that the one or more said images are not visually similar to images that have already been selected as one of the representative images of the repository.

12. A method as described in claim 11, wherein the activations describe an amount of a corresponding image characteristic.

13. A method as described in claim 11, wherein the detected activations for a respective said patch are included in a vector that has a plurality of dimensions, each of the dimensions corresponding to a respective said image characteristic.

14. A method as described in claim 11, further comprising rejecting images that do not meet an image quality score threshold and wherein the plurality of images processed as part of the curating meet the image quality score threshold.

15. A method as described in claim 11, wherein the receiving includes receiving the plurality of images as part of an image search result or the repository is a folder.

16. A system to control curation of images to represent a repository of images, the system comprising:
an image curation module implemented at least partially in hardware to curate a plurality of images of the repository to select representative images of the repository, the image curation module including:
a joint image and face aesthetic calculation module to calculate a score based on image and face aesthetics, jointly, for each of the plurality of images through processing by a neural network;
an image ranking module to rank the plurality of images based on respective said scores; and
an image selection module to select one or more of the plurality of images as one of the representative images of the repository based on the ranking and a determination that the one or more said images are not visually similar to images that have already been selected as one of the representative images of the repository.

17. A system as described in claim 16, wherein the image curation module further comprises an image quality score module configured to reject images that do not meet an image quality score threshold.

18. A system as described in claim 16, wherein joint image and face aesthetic calculation module is configured to calculate the score based on image and face aesthetics, jointly, for each of the plurality of images by:
generating a plurality of patches from the each said image;
detecting activations of a plurality of image characteristics for each of the plurality of patches using the neural network, the plurality of image characteristics pertaining to image and face aesthetics; and
the calculating of the score is based on at least in part on the detected activations.

19. A system as described in claim 18, wherein the calculating of the score includes aggregating the detected activations for the plurality of patches.

20. A system as described in claim 18, wherein the detected activations for a respective said patch are included in a vector that has a plurality of dimensions, each of the dimensions corresponding to a respective said image characteristic.

* * * * *